United States Patent
Xu et al.

(10) Patent No.: US 10,803,594 B2
(45) Date of Patent: Oct. 13, 2020

(54) METHOD AND SYSTEM OF ANNOTATION DENSIFICATION FOR SEMANTIC SEGMENTATION

(71) Applicant: Beijing Didi Infinity Technology And Development Co., Ltd., Beijing (CN)

(72) Inventors: Xun Xu, Mountain View, CA (US); Ruxiao Bao, Mountain View, CA (US)

(73) Assignee: Beijing Didi Infinity Technology And Development Co., Ltd., Beijing (CN)

( * ) Notice: Subject to any disclaimer, the term of this patent is extended or adjusted under 35 U.S.C. 154(b) by 67 days.

(21) Appl. No.: 16/237,268

(22) Filed: Dec. 31, 2018

(65) Prior Publication Data

US 2020/0211200 A1 Jul. 2, 2020

(51) Int. Cl.
*G06K 9/62* (2006.01)
*G06T 7/187* (2017.01)
(Continued)

(52) U.S. Cl.
CPC .......... *G06T 7/187* (2017.01); *G06K 9/00671* (2013.01); *G06N 3/084* (2013.01);
(Continued)

(58) Field of Classification Search
None
See application file for complete search history.

(56) References Cited

U.S. PATENT DOCUMENTS 7,043,078 B2 * 5/2006 Guleryuz ........... G06K 9/00456
358/3.01
10,043,113 B1 8/2018 Kim et al.
(Continued)

FOREIGN PATENT DOCUMENTS

| CN | 108229478 A | 6/2018 | |
|---|---|---|---|
| EP | 3553752 A1 * | 10/2019 | ......... G09K 9/00805 |
| GB | 2538847 A | 11/2016 | |

OTHER PUBLICATIONS

Mask R-CNN for Object Detection and Segmentation, GitHub, Feb. 28, 2019, pp. 1-15 (Year: 2019).*

(Continued)

*Primary Examiner* — Jayesh A Patel
(74) *Attorney, Agent, or Firm* — Kilpatrick Townsend & Stockton LLP (57) ABSTRACT

Methods and systems of annotation densification for semantic segmentation are disclosed herein. In one example embodiment, such a method includes obtaining image information, obtaining coarse annotation information, performing an image matting operation based upon the image information and based at least indirectly upon the coarse annotation information, and applying an already-trained Convolutional Neural Network (ConvNet) semantic segmentation model in relation to the image information. The method also includes performing a merging operation with respect to both first intermediate information generated at least indirectly by the performing of the image matting operation and second intermediate information generated at least indirectly by the applying of the ConvNet model, where the performing of the merging operation results in fine semantic segmentation annotation information, whereby an additional semantic segmentation model can be trained using that annotation information and the trained additional semantic segmentation model can be applied to generate semantic segmentation output information.

20 Claims, 5 Drawing Sheets

(51) Int. Cl.
  *G06K 9/00* (2006.01)
  *G06T 7/11* (2017.01)
  *G06N 3/08* (2006.01)
  *G06N 20/00* (2019.01)
  *G06N 5/04* (2006.01)

(52) U.S. Cl.
  CPC .............. *G06N 5/04* (2013.01); *G06N 20/00* (2019.01); *G06T 7/11* (2017.01); *G06T 2207/20084* (2013.01); *G06T 2207/20221* (2013.01)

(56) References Cited

U.S. PATENT DOCUMENTS

| | | | |
|---|---|---|---|
| 10,049,323 | B1 | 8/2018 | Kim et al. |
| 10,095,977 | B1 | 10/2018 | Kim et al. |
| 10,163,022 | B1 | 12/2018 | Cho |
| 10,169,679 | B1 | 1/2019 | Kim et al. |
| 10,410,353 | B2 * | 9/2019 | Feng ................. G06N 3/04 |
| 10,643,066 | B2 * | 5/2020 | Zhang ................ G06F 40/169 |
| 10,672,129 | B1 * | 6/2020 | Yoo ................... G06T 7/13 |
| 2004/0175037 | A1 * | 9/2004 | Guleryuz ............ G06T 5/004 382/180 |
| 2005/0060308 | A1 * | 3/2005 | Naphade ............. G06F 16/58 |
| 2007/0005529 | A1 * | 1/2007 | Naphade ............. G06F 16/48 706/16 |
| 2008/0005159 | A1 * | 1/2008 | Kang ................. G06F 16/319 |
| 2009/0290802 | A1 * | 11/2009 | Hua .................. G06K 9/34 382/225 |
| 2011/0087703 | A1 * | 4/2011 | Varadarajan ........ G06F 16/7867 707/794 |
| 2011/0229017 | A1 * | 9/2011 | Liu ................... G06F 16/48 382/159 |
| 2014/0023341 | A1 * | 1/2014 | Wang ................. G11B 27/105 386/240 |
| 2016/0019695 | A1 * | 1/2016 | Chukka ............... G06T 7/0014 382/128 |
| 2017/0231550 | A1 * | 8/2017 | Do .................... A61B 5/7264 382/128 |
| 2018/0218516 | A1 * | 8/2018 | Reda ................. G06T 7/70 |
| 2018/0373934 | A1 * | 12/2018 | Bridges .............. G06K 9/6267 |
| 2019/0205700 | A1 * | 7/2019 | Gueguen ............. G06K 9/2054 |
| 2019/0259136 | A1 * | 8/2019 | Shpalensky ......... G06T 5/50 |
| 2019/0333222 | A1 * | 10/2019 | Gatti ................. G06T 7/143 |

OTHER PUBLICATIONS

Natural Image matting, Valay Shah., Computational photography, Dec. 21, 2012, pp. 1-7 (Year: 2012).*
Multi-Task learning—Semantics, Alex Kendall et al., arXiv, Apr. 24, 2018, pp. 1-14 (Year: 2018).*
Qure.ai Blog, A 2017 Guide to Semantic Segmentation with Deep Learning, Sasank Chilamkurthy, Jul. 5, 2017, pp. 1-19 (Year: 2017).*
How to do semantic segmentation using Deep Learning, Dec. 11, 2018, pp. 1-12 (Year: 2018).*
"Image Segmentation", Wikipedia <https://en.wikipedia.org/wiki/Image_segmentation> Date accessed Dec. 11, 2018, pp. 1-16.
Le, James, "How to do Semantic Segmentation using Deep Learning" <https://medium.com/nanonets/how-to-do-image-segmentation-using-deep-learning-c673cc5862ef> Date accessed Dec. 11, 2018, pp. 1-12.
Chilamkurthy, Sasank, "A 2017 Guide to Semantic Segmentation with Deep Learning", <http://blog.qure.ai/notes/semantic-segmentation-deep-learning-review> Date accessed Dec. 11, 2018, pp. 1-19.
"Models and examples built with TensorFlow." GitHub <https://github.com/tensorflow/models> Date accessed Feb. 28, 2019, pp. 1-2.
"Mask R-CNN for object detection and instance segmentation on Keras and TensorFlow". GitHub <https://github.com/matterport/Mask_RCNN> Date accessed Feb. 28, 2019, pp. 1-15.
Bengio et al. "Curriculum learning" In Proceedings of the 26th Annual International Conference on Machine Learning, ICML '09, pp. 41-48, New York, NY, USA, 2009. ACM, pp. 1-8.
Chen et al. Deeplab: Semantic image segmentation with deep convolutional nets, atrous convolution, and fully connected CRFs CoRR, abs/1606.00915, 2016, pp. 1-14.
Chen et al. "Rethinking atrous convolution for semantic image segmentation" CoRR, abs/1706.05587, 2017, pp. 1-14.
Chen et al. "Encoder-decoder with atrous separable convolution for semantic image segmentation" CoRR, abs/1802.02611, 2018, pp. 1-18.
Chollet, Francois. "Xception: Deep learning with depthwise separable convolutions" CoRR, abs/1610.02357, 2016, pp. 1-8.
Cordts et al. "The cityscapes dataset for semantic urban scene understanding" CoRR, abs/1604.01685, 2016, pp. 1-29.
Dai et al. "Deformable convolutional networks" CoRR, abs/1703.06211, 2017, pp. 1-12.
He et al. "Mask R-CNN" CoRR, abs/1703.06870, 2017, pp. 1-12.
Lin et al. "Feature pyramid networks for object detection" CoRR, abs/1612.03144, 2016, pp. 1-10.
Liu et al. "Path aggregation network for instance segmentation" CoRR, abs/1803.01534, 2018, pp. 1-11.
Ren et al. "Faster R-CNN: towards real-time object detection with region proposal networks" CoRR, abs/1506.01497, 2015, pp. 1-14.
Chen et al. "KNN Matting" Pattern Analysis and Machine Intelligence, IEEE Transactions on, 35(9):2175-2188, Sep. 2013.
He et al. "A global sampling method for alpha matting" In Proceedings of the 2011 IEEE Conference on Computer Vision and Pattern Recognition, CVPR '11, pp. 2049-2056, Washington, DC, USA, 2011. IEEE Computer Society.
Levin et al. "A closed form solution to natural image matting" In Proceedings of the 2006 IEEE Computer Society Conference on Computer Vision and Pattern Recognition—vol. 1, CVPR '06, pp. 61-68, Washington, DC, USA, 2006. IEEE Computer Society.
Levin et al. "Spectral matting" IEEE Trans. Pattern Anal. Mack Intell., 30(10):1699-1712, Oct. 2008.
Ronneberger et al. "U-Net: Convolutional networks for biomedical image segmentation" CoRR, abs/1505.04597, 2015.
Dai et al. "Deformable Convolutional Networks—MSRA COCO Detection & Segmentation Challenge 2017 Entry" pp. 1-19.
Sun et al. "Poisson matting" ACM Trans. Graph., 23(3):315-321, Aug. 2004.
Yu et al. "Multi-scale context aggregation by dilated convolutions" CoRR, abs/1511.07122, 2015.
Zhao et al. "Pyramid scene parsing network" CoRR, abs/1612.01105, 2016, pp. 1-11.
Zhuang et al. "Dense relation network: Learning consistent and context-aware representation for semantic image segmentation" pp. 1-6, 2018.
Shah, Valay "Natural Image Matting" CS129 Computational Photography Final Project <http://cs.brown.edu/course/cs129/results/final/valayshah> Date accessed Dec. 10, 2018, pp. 1-7.
Russakovsky et al. "ImageNet Large Scale Visual Recognition Challenge" IJCV 2015, pp. 1-43.
Lin et al. "Microsoft COCO: Common objects in context" In: ECCV. (2014) pp. 1-15.
Chen, et al., "Semantic Human Matting", Available Online at https://arxiv.org/pdf/1809.01354.pdf, Sep. 2018, pp. 1-9.
Extended European Search Report for EP18880069.2 dated Mar. 9, 2020, 10 pages.
Jing, et al., "Coarse-to-Fine Semantic Segmentation From Image-Level Labels", IEEE Transactions on Image Processing, vol. 29, Dec., 2018, pp. 225-236.

* cited by examiner

METHOD AND SYSTEM OF ANNOTATION DENSIFICATION FOR SEMANTIC SEGMENTATION

CROSS-REFERENCE TO RELATED APPLICATIONS

- -

Statement Regarding Federally Sponsored Research Or Development

- -

Field

The present disclosure relates to computer vision or related image processing and, more particularly, to methods of semantic segmentation.

Background

Semantic segmentation involves the assigning of semantic labels to different pixels, and typically to all of the pixels, of an image. Recently, semantic segmentation has grown in importance due to its role in facilitating improved computer vision and enhancing the understanding of a visual image or scene. Notwithstanding the value of semantic segmentation, it is a challenging visual recognition task. First, to achieve a desired (or ideal) level of quality in performing semantic segmentation (in contrast to what is required to perform image-level classification), it is not only important to satisfy a first objective of achieving correctness in per-pixel classification, but also important to satisfy a second objective of preserving boundary refinement. Yet achieving the former objective can require global semantics even though achieving the latter objective can call for local information, and achieving both of these objectives simultaneously can be difficult.

Machine learning-based methods, especially those based on deep convolutional neural networks, demand large numbers of images labeled with pixel-wise annotations for training. In contrast to image-level annotations (e.g., class label or tags for the whole image), pixel-wise semantic labels can be extremely time consuming to generate, in terms of the time required from human operators (or reviewers) to generate those labels. Indeed, to provide high-quality pixel-wise annotations with respect to a given image, it is often necessary for human operators to carefully trace and mark regions in the image that respectively correspond to different objects or material (e.g., grass). Thus, it can be expensive to generate pixel-wise semantic labels used for training semantic segmentation algorithms.

To reduce the annotation cost to some extent, some data vendors choose to provide coarse semantic labels. When such coarser semantic labels are generated, the major (usually central) part of each semantic region is marked with a label, and the fine boundaries between regions are left unlabeled. Pixel-level coarse annotation effectively constitutes a manner of labeling in which there is a trading off of accuracy regarding object boundaries for annotation speed, with each polygon only including pixels belonging to a single object class. Although such coarser semantic labels are less expensive to generate than higher-quality pixel-wise semantic labels, such labels are less useful than pixel-wise semantic labels when employed for training semantic segmentation algorithms.

Therefore, it would be advantageous if one or more new or improved methods could be developed that largely or entirely overcame one or more of the aforementioned limitations associated with semantic segmentation methods, and/or avoided or overcame one or more other disadvantages, and/or provided one or more other advantages.

Summary

In at least some example embodiments encompassed herein, the present disclosure relates to a method of annotation densification for semantic segmentation, performed to improve the quantity and quality of training data for semantic segmentation algorithms. The method includes obtaining image information concerning one or more first images, obtaining coarse annotation information, and generating at least one trimap based upon the coarse annotation information. The method also includes performing an image matting operation based upon the image information and based upon the at least one trimap, by way of at least one processing device, and generating alpha map information (e.g., at least one alpha map) based upon first intermediate information resulting from the image matting operation. The method further includes applying an already-trained Convolutional Neural Network (ConvNet) semantic segmentation model based upon the image information, by way of the at least one processing device, and generating probability map information based upon second intermediate information resulting from the applying of the already-trained ConvNet semantic segmentation model. Additionally, the method includes performing a merging operation with respect to both the alpha map information and the probability map information, by way of the at least one processing device, where the performing of the merging operation results in fine semantic segmentation annotation information including a plurality of semantic labels pertaining respectively to a plurality of pixels of the one or more first images.

In at least some such embodiments, the method further includes training an additional semantic segmentation model (e.g., a Convolutional Neural Network model) using the fine semantic segmentation annotation information and image information, and using the trained additional semantic segmentation model for inference to generate semantic segmentation output information. Additionally, the method also includes outputting at least some of the semantic segmentation output information (e.g., semantic segmentation maps), or other information, or at least one signal based at least indirectly upon the at least some of the semantic segmentation output information, for receipt by another device or system.

In at least one additional example embodiment encompassed herein, the present disclosure relates to a method of annotation densification for semantic segmentation. The method includes obtaining image information concerning one or more first images, obtaining coarse annotation information, and performing an image matting operation based upon the image information and based at least indirectly upon the coarse annotation information, by way of at least one processing device. The method also includes applying an already-trained Convolutional Neural Network (ConvNet) semantic segmentation model in relation to the image information, by way of the at least one processing device, and performing a merging operation with respect to both first intermediate information generated at least indirectly by the performing of the image matting operation and second intermediate information generated at least indirectly by the applying of the already-trained ConvNet semantic segmentation model, by way of the at least one processing device. The performing of the merging operation results in fine semantic segmentation annotation information pertaining to a plurality of pixels of the one or more first images, whereby an additional semantic segmentation model can be trained using the fine semantic segmentation annotation information, and the trained additional semantic segmentation model or a copy of the trained additional semantic segmentation model can be applied to generate semantic segmentation output information.

In at least one further example embodiment encompassed herein, the present disclosure relates to a system for annotation densification for semantic segmentation. The system includes one or more storage devices configured to store both image information concerning one or more first images and coarse annotation information. The system also includes one or more processing devices coupled at least indirectly with the one or more storage devices. The one or more processing devices are configured to execute instructions according to which the one or more processing devices: (a) generate at least one trimap based upon the coarse annotation information; (b) perform an image matting operation based upon the image information and based upon the at least one trimap; (c) generate alpha map information based upon first intermediate information resulting from the image matting operation; (d) apply an already-trained Convolutional Neural Network (ConvNet) semantic segmentation model in relation to the image information; (e) generate probability map information based upon second intermediate information resulting from the applying of the already-trained ConvNet semantic segmentation model; (f) perform a merging operation with respect to both the alpha map information and the probability map information, wherein the merging operation results in fine semantic segmentation annotation information including a plurality of semantic labels pertaining respectively to a plurality of pixels of the one or more first images; (g) train an additional semantic segmentation model using the fine semantic segmentation annotation information and image information; and (h) use the trained additional semantic segmentation model for inference to generate semantic segmentation output information. The system further includes one or more output devices coupled at least indirectly with the one or more processing devices. The one or more output devices is or are configured to output at least some of the semantic segmentation output information, or other information or at least one signal based at least indirectly upon the at least some of the semantic segmentation output information, for receipt by another device or system.

DETAILED DESCRIPTION

The present disclosure relates to methods of (or for) improving semantic segmentation that involve combining multiple different types of information arising respectively from multiple different sources so as to automatically generate fine semantic segmentation annotations pertaining to an image. In accordance with at least some example embodiments of such improved methods that are encompassed herein, the multiple types of information can include each of an input image (e.g., pixel color values for each pixel of the input image), coarse annotation information, and prediction(s) arising from one or more already-trained semantic segmentation model(s) as applied to the input image. By utilizing each of these different types of information, the semantic segmentation annotation densification process can draw upon positive attributes associated with each of these different types of information and simultaneously diminish the extent to which weaknesses associated with the different types of information negatively impact the process, and thereby generate enhanced semantic segmentation annotations.

More particularly, such methods of improving semantic segmentation that are encompassed herein can benefit from the high level of correctness of coarse annotation in terms of describing the semantic of each labeled region, can also benefit from the rich and fine cues about the boundaries between objects and material (or "stuffs," e.g., grass, sky) provided by an input image, and can benefit from one or more of the predictive capabilities associated with one or more existing (e.g., already-trained) segmentation models, in terms of predicting labels or boundaries of semantic regions in the input image. At the same time, various limitations associated with each of these types of information on its own—for example, an absence of boundary information in coarse annotation information, a lack of semantic information within an input image, and imperfections associated with the prediction capabilities of existing segmentation models—can be eliminated or moderated. Indeed, by leveraging and combining each of these different types of information (e.g., input image information, coarse annotation information, and prediction information) from these different information sources, which can be to some extent be viewed as complementary to one another, such a method can generate fine semantic segmentation annotations that are of much higher quality than the original coarse annotations, with virtually no additional cost.

Further, in at least some embodiments of methods for improving semantic segmentation encompassed herein, one or more particular forms of processing can be employed to enhance the usefulness of one or more of the types of information that are being utilized, and/or to facilitate the combination or merging of the different types of information so as to arrive at enhanced semantic segmentation annotations. For example, although an input image can contain cues about fine boundaries between semantic regions, the boundary information often is not readily available. Therefore, in at least some embodiments encompassed herein, matting algorithm(s) are applied to produce an alpha map with fine region boundaries from the input image. Further, in at least some such embodiments, the coarse annotation information is utilized to generate trimap(s) that in turn permit initialization of such matting algorithm(s) used to produce the alpha map. Additionally, in at least some embodiments encompassed herein, the predictions generated by way of one or more semantic segmentation algorithm(s) can be fused or merged with the matting-produced alpha map so as to generate the final fine annotation. Such merging can be performed in a variety of manners depending upon the embodiment.

For example, in one such embodiment of a method for improving semantic segmentation encompassed herein, the method includes linearly combining probability maps generated by the one or more conventional semantic segmentation algorithm(s) with alpha maps generated as a result of imaging matting. Also, in another such embodiment of a method for improving semantic segmentation encompassed herein, the method includes training a learning-based model (e.g., a ConvNet) to optimally combine multiple input maps into the desired fine annotation.

In general, at least some of the methods for improving semantic segmentation described herein involve merging/combining (i) the results of natural image matting performed based upon image information and trimap information generated based upon coarse annotation information with (ii) ConvNet-based prediction information, so as to generate fine annotation information, which along with image information is then used for training a semantic segmentation model to output semantic segmentation maps. Further, at least some such methods of improving semantic segmentation can be referred to or described as methods of coarse annotation densification. Thus, although it is intended that the present disclosure encompass any of a variety of methods and systems for improving semantic segmentation, among other things the present disclosure encompasses methods and systems for annotation densification for boosting the performance of semantic segmentation, or achieving enhanced semantic segmentation.

Figure 1:
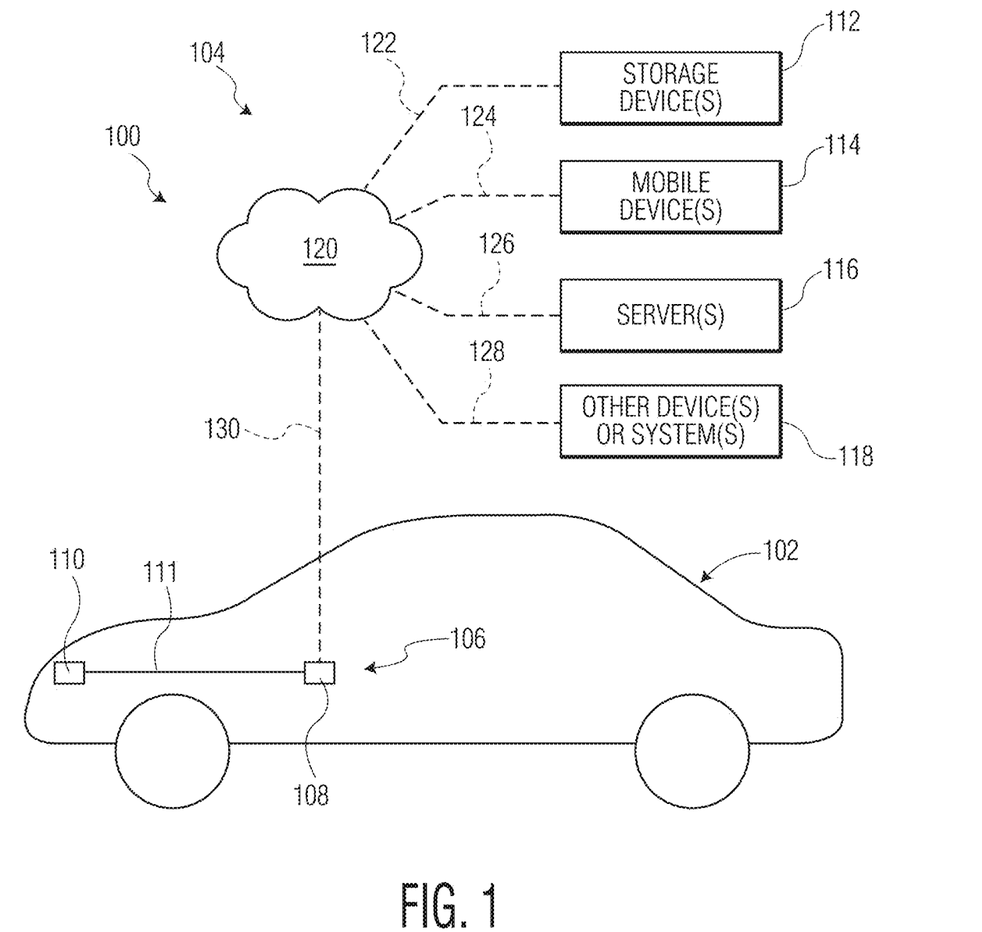
FIG. 1 is a schematic diagram showing an example electrical system implemented in part on a vehicle, where the electrical system is configured for performing a method of semantic segmentation, in accordance with an example embodiment encompassed herein.

Referring to FIG. 1, a schematic illustration is provided to show an example electrical system 100 that can perform one or more methods of improving semantic segmentation in accordance with embodiments encompassed herein. As illustrated, in FIG. 1 the electrical system 100 can include a vehicle 102, which in the present example can be an electrically-powered automobile, and remote electrical system components 104 that are external of the vehicle. Additionally, FIG. 1 shows an on-board electrical system 106 that constitutes part of, and is supported within/by, the vehicle 102 (and thus also constitutes part of the electrical system 100). The on-board electrical system 106 in FIG. 1 is shown, in a simplified manner, to include a computer system 108 that is in communication with input/output devices 110 by way of one or more communication link(s) 111, although several more specific features that can be present in one example of the on-board electrical system are described in more detail with respect to FIG. 2. As described further in regard to FIG. 2, it should be appreciated that the input/output devices 110 can, and typically will, include one or more camera devices.

Further, FIG. 1 shows that the on-board electrical system 106 of the vehicle 102, in the present embodiment, can be in communication with any of a variety of different electrical system components 104 that are located remotely from the vehicle 102. In the schematic diagram of FIG. 1, the remote electrical system components 104 include one or more storage device(s) 112, one or more mobile device(s) 114, one or more server computer(s) (or server(s)) 116, and one or more other device(s) or system(s) 118, and each of the remote electrical system components 104 is figuratively illustrated as being in communication with the on-board electrical system 106 by way of a network 120 representing the Internet (or, alternatively, the World Wide Web). First, second, third, fourth, and fifth communication links 122, 124, 126, 128, and 130 are respectively shown as coupling the one or more storage device(s) 112, the one or more mobile device(s) 114, the one or more server computer(s) 116, the one or more other device(s) or system(s) 118, and the computer system 108 of the on-board electrical system 106 with the network 120. Each of the communication links 122, 124, 126, 128, and 130 can be understood to encompass any one or more wireless or wired communication links, with the communication link(s) 130 particularly including at least one wireless component consistent with mobility of the vehicle 102.

Figure 2:
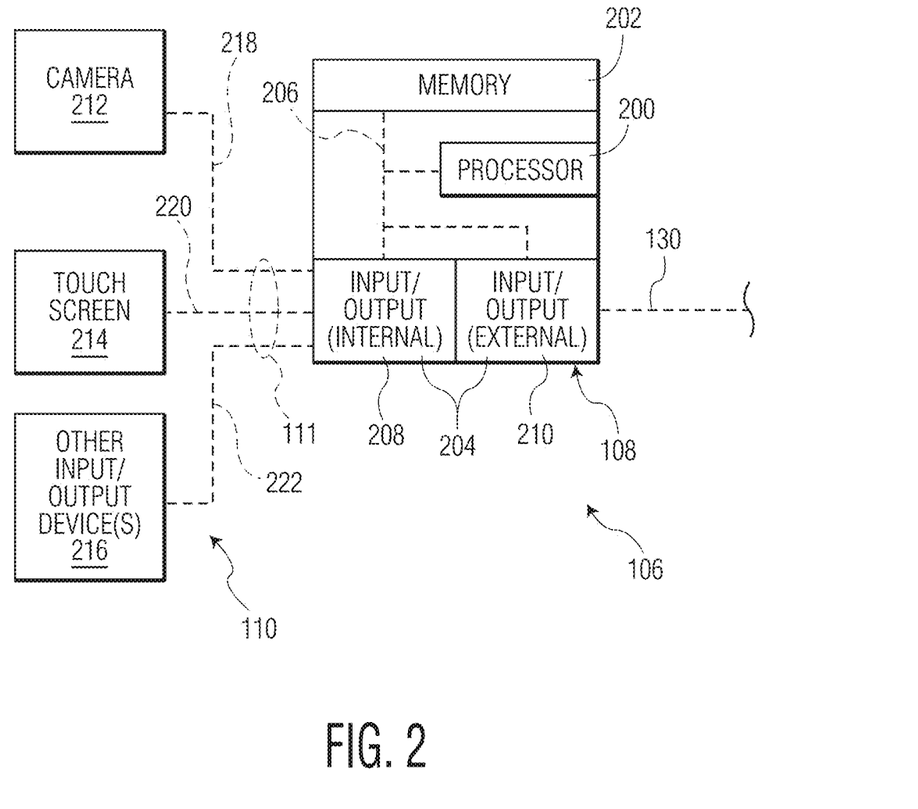
FIG. 2 is an additional schematic diagram showing in more detail portions of the electrical system of FIG. 1.

Referring additionally to FIG. 2, the on-board electrical system 106 is shown in more detail, to show example components/subcomponents/devices of that system. Consistent with FIG. 1, the on-board electrical system 106 of FIG. 2 is shown to include the computer system 108 and the one or more input/output devices 110, with the computer system 108 and devices 110 being in communication by way of the one or more communication link(s) 111. More particularly as shown in FIG. 2, in the present embodiment the computer system 108 of the on-board electrical system 106 can be a general-purpose computer or a special-purpose computer, and can include a processor 200, a memory 202, and one or more input/output port(s) 204. Each of the processor 200, the memory 202, and the one or more input/output port(s) 204 are in communication with one another, directly or indirectly, by way of one or more internal communications link(s) 206, which can include wired or wireless links depending upon the embodiment. In at least some such embodiments, the internal communication link(s) 206 can take the form of a bus.

With respect to the processor 200, it should be appreciated that the processor 200 is intended to be representative of the presence of any one or more processors or processing devices, of any of a variety of forms. For example, the processor 200 is intended to be representative of any one or more of a microprocessor, a central processing unit (CPU), a controller, a microcontroller unit, an application-specific integrated circuit (ASIC), an application-specific instruction-set processor (ASIP), a graphics processing unit (GPU), a digital signal processor (DSP), a field programmable gate array (FPGA), a programmable logic device (PLD), a physics processing unit (PPU), a reduced instruction-set computer (RISC), or the like, or any combination thereof. The processor 200 can be configured to execute program instructions including, for example, instructions provided via software, firmware, operating systems, applications, or programs, and can be configured for performing any of a variety of processing, computational, control, or monitoring functions.

Further, the memory 202 of FIG. 2 is intended to be representative of the presence of any one or more memory or storage devices, which can be employed to store or record computer program instructions (e.g., those of an operating system or application), data, or information of any of a variety of types. In accordance with the present disclosure, such memory or storage devices can particularly be employed to store coarse annotation, image, or semantic label information as can be used or generated by way of semantic segmentation methods such as the improved methods described herein. Depending upon the embodiment, the memory 202 can include any one or more of a variety of types of devices or components (or systems) such as, for example, mass storage devices, removable storage devices, hard drives, magnetic disks, optical disks, solid-state drives, floppy disks, flash drives, optical disks, memory cards, zip disks, magnetic tape, volatile read-and-write memory, random access memory (RAM) (e.g., dynamic RAM (DRAM) or static RAM (SRAM), etc.), or read-only memory (ROM) (e.g., erasable or electrically-erasable programmable ROM (EPROM or EEPROM), etc.).

Although the on-board electrical system 106, and particularly the computer system 108, is shown in FIG. 2 as including the memory 202 as part of that computer system, it should be evident from the storage device(s) 112 of FIG. 1 that the present disclosure is also intended to encompass embodiments in which the memory 202 operates in combination with, or is replaced by, one or more remote memory devices. Such remote memory devices corresponding to the storage device(s) 112 can include, for example, a cloud platform such as a public or private cloud, which is located remotely from the vehicle 102. Also, in some embodiments, the memory 202 and processor 200 can be integrated in a single device (e.g., a processor-in-memory (PIM)).

Additionally with respect to FIG. 2, the processor 200 and the memory 202 can be configured to include a Convolutional Neural Network (also referred to herein as a "ConvNet" or alternatively a "CNN") or multiple Convolutional Neural Networks to perform the methods of improving semantic segmentation described herein. Such a ConvNet can be configured to adapt and improve upon data ingested by the ConvNet.

Further with respect to FIG. 2, the input/output ports 204 are shown to include each of internal input/output ports 208, by which the computer system 108 is coupled to the one or more input/output devices 110 of the on-board electrical system 106, as well as external input/output ports 210, which permit or facilitate communications between the computer system 108 and the remote electrical system components 104 (see FIG. 1). It should be appreciated that the external input/output ports 210 can be understood to include one or more devices, such as one or more wireless transponders, by which wireless communications can occur between the computer system 108 and the remote electrical system components 104 via the communication link(s) 130. Particularly with respect to the internal input/output ports 208, depending upon the embodiment, any one or more input/output devices 110 of any of a variety of types can be included by the on-board electrical system 106, and the number and configuration of the internal input/output ports 208 will be suited to allow for appropriate communications between the computer system 108 and the input/output devices by way of the one or more communication link(s) 111.

Although the particular input/output devices 110, internal input/output ports 208, and communication link(s) 111 can vary depending upon the embodiment, in the present example embodiment the input/output devices 110 particularly are shown to include each of a camera 212, a touch screen 214, and one or more other input/output device(s) 216. Relatedly, as shown in FIG. 2, the communication link(s) 111 in the present embodiment include communication links 218, 220, and 222 that respectively couple the internal input/output ports 208 with the camera 212, touch screen 214, and other input/output device(s) 216. It will be appreciated that the camera 212 particularly can be an optical camera that can obtain imaging data regarding one or more images of an environment surrounding the vehicle 102, which can be provided and utilized by other components of the electrical system 100 such as the computer system 108 or the one or more remote electrical system components 104 to perform semantic segmentation in accordance with any of a variety of methods including the improved methods described herein.

It should be appreciated that the on-board electrical system 106, acting alone or in combination with the one or more remote electrical system components 104, can perform one or more other monitoring operations (e.g., based upon data provided by way of the input/output devices 110) and/or one or more other control operations in relation to the vehicle 102 or otherwise. Relatedly, it should be appreciated that the methods of improving semantic segmentation described herein can be understood to be subportions of other methods or processes that are larger or more expansive. The present disclosure, although describing methods of improving semantic segmentation, is intended to encompass such larger or more expansive methods or processes. Such larger or more expansive methods or processes can additionally include, for example, method or process steps or portions according to which information to be input or utilized for semantic segmentation is obtained or pre-processed so as to be suitable for semantic segmentation. Additionally, such larger or more expansive methods or processes can also include, further for example, method or process steps or portions according to which the results of semantic segmentation processes (e.g., semantic annotations) are utilized for other computer vision or image processing tasks or other tasks, as well as method or process steps or portions according to which the results of such other steps or portions are used to take various actions.

For example, it should be appreciated that, in some embodiments or circumstances, the results from semantic segmentation processes can be utilized, directly or indirectly, to make autonomous vehicle driving determinations. Also for example, it should be appreciated that, in some embodiments or circumstances, the other input/output device(s) 216 can include other sensors or sensing systems that can detect aspects of the environment surrounding the vehicle 102, such as radar or lidar sensing systems. In some such embodiments or circumstances, the computer system 108 (alone or in combination with the one or more remote electrical system components 104) can make autonomous vehicle driving determinations or other determinations based upon combined portions of information including not only the results of semantic segmentation methods such as the improved methods described herein, but also upon other sensed information as can be obtained via radar, lidar, or other sensing systems or sensors. Further, for example, based upon such autonomous vehicle driving determinations, the computer system 108 (alone or in combination with the one or more remote electrical system components 104) can generate and provide control signals to one or more components of the vehicle 102 including one or more of the input/output device(s) 216, for example, to a vehicle acceleration actuator, a brake actuator, a steering actuator, a turn signal actuator, or a light actuator.

Notwithstanding the description provided above in regard to FIG. 1 and FIG. 2, it should be appreciated that the present disclosure is intended to be applicable to numerous other embodiments, implementations, or applications other than those described above in regard to FIG. 1 and FIG. 2. Indeed, although the vehicle 102 is described above as being an electrically-powered automobile (electric vehicle), the present disclosure also is intended to pertain to embodiments, implementations, or applications involving gasoline-powered automobiles and automobiles powered in other manners, as well as any of a variety of other types of vehicles or transportation systems. Such other types of vehicles or transportation systems can include, for example, a taxi, a bus, a train, a marine vessel or boat, an airplane or helicopter, or a spaceship. Additionally, notwithstanding the description provided above with respect to FIG. 1 and FIG. 2 that particularly relates to embodiments involving a vehicle, the present disclosure is intended to encompass numerous other embodiments, implementations, and applications in which methods of improving semantic segmentation are performed. For example, the present disclosure also pertains to other applications in which any of computer vision, image processing, or machine learning are employed, including for example applications involving augmented reality (or even virtual reality).

For example, notwithstanding the description above pertaining to a vehicle embodiment in relation to FIG. 1 and FIG. 2, the present disclosure is intended to encompass other embodiments in which methods of semantic segmentation are performed by way of computer systems that do not form parts of vehicles but rather form parts of other devices including, for example, mobile devices such as smart phones, laptop computers, tablets, wearable devices, personal digital assistants (PDAs), navigation devices, gaming devices, virtual reality devices, or augmented reality devices. In any of such mobile devices or other devices, an electrical system corresponding to the electrical system 106, including both a computer system corresponding to the computer system 108 and one or more input/output devices corresponding to the input/output devices 110, can be included. Also, in any of such mobile devices or other devices, the electrical system corresponding to the electrical system 106 can likewise be configured for communication with one or more remote devices corresponding to the remote electrical system components 104.

Among other things, the present disclosure is intended to encompass any such mobile or other device (e.g., a personal computer, user terminal, or server computer, etc.) that is configured to perform any of the methods for improving semantic segmentation described herein. In some such mobile or other devices, information utilized by the methods of semantic segmentation can be obtained or received by way of operation of one or more of the input/output devices included on the mobile or other devices. For example, image information employed by a method of semantic segmentation can be obtained by way of a camera that is mounted on the mobile device. Also, in some such embodiments (as well as in some implementations corresponding to the electrical system 100 of FIG. 1), one type of information utilized by the methods of improving semantic segmentation (e.g., image information) can be received by way of operation of one or more of the input/output devices of the respective mobile or other device itself, even though another type of information utilized by the methods of improving semantic segmentation (e.g., coarse annotation information) can be received from one or more remote devices corresponding to the remote electrical system component(s) 104.

Additionally, it should be appreciated that the present disclosure is intended to encompass numerous different embodiments in which an electrical system such as the electrical system 106 of a device, such as the vehicle 102, a mobile device, or other device, is in communication with one or more other remote devices, systems, or components by way of any of a variety of wired or wireless communications systems, networks, links, processes, or protocols. For example, the network 120 and associated communication links 122, 124, 126, 128, and 130 are intended to be representative of, or can be replaced by, any of a variety of networks, communications links, or associated technologies including, for example, a cellular network, a local area network (LAN), a wide area network (WAN), a wireless local area network (WLAN), Wi-Fi communications links or access points, a metropolitan area network (MAN), a public telephone switched network (PSTN), a Bluetooth network, a ZigBee network, a near field communication (NFC) network, or the like, or any combination thereof. Additionally, the network 120 and associated communication links 122, 124, 126, 128, and 130 are intended to be representative of, or can be replaced (or replaced in part) by, wired technologies such as a cable network, a wireline network, an optical fiber network, or a telecommunications network.

It should be appreciated that, in some embodiments, implementations, and applications encompassed herein, methods of improving semantic segmentation are performed largely or entirely by a single computer or electrical system associated with a particular device, for example, by the electrical system 106 of the vehicle 102 of FIG. 1. However, it should also be recognized that, in other embodiments, implementations, and applications encompassed herein, the performing of methods for improving semantic segmentation occurs in a manner that involves multiple electrical systems or computer systems, which in some cases can be remotely located apart from one another, and/or perform the methods in a distributed manner. Indeed, in some cases, multiple electrical systems and/or computer systems each having respective components or portions corresponding to those described in regard to the electrical system 106 and/or the computer system 108 of FIG. 2 can be present and can interact with one another. For example, FIG. 1 can also be viewed as encompassing an embodiment in which a method of improving semantic segmentation is performed in a distributed manner both by the electrical system 106 of the vehicle 102 and an electrical system of one of the mobile devices 114, where the electrical system of the mobile device includes both a camera and a computer system having components corresponding to those of the computer system 108.

Figure 3:
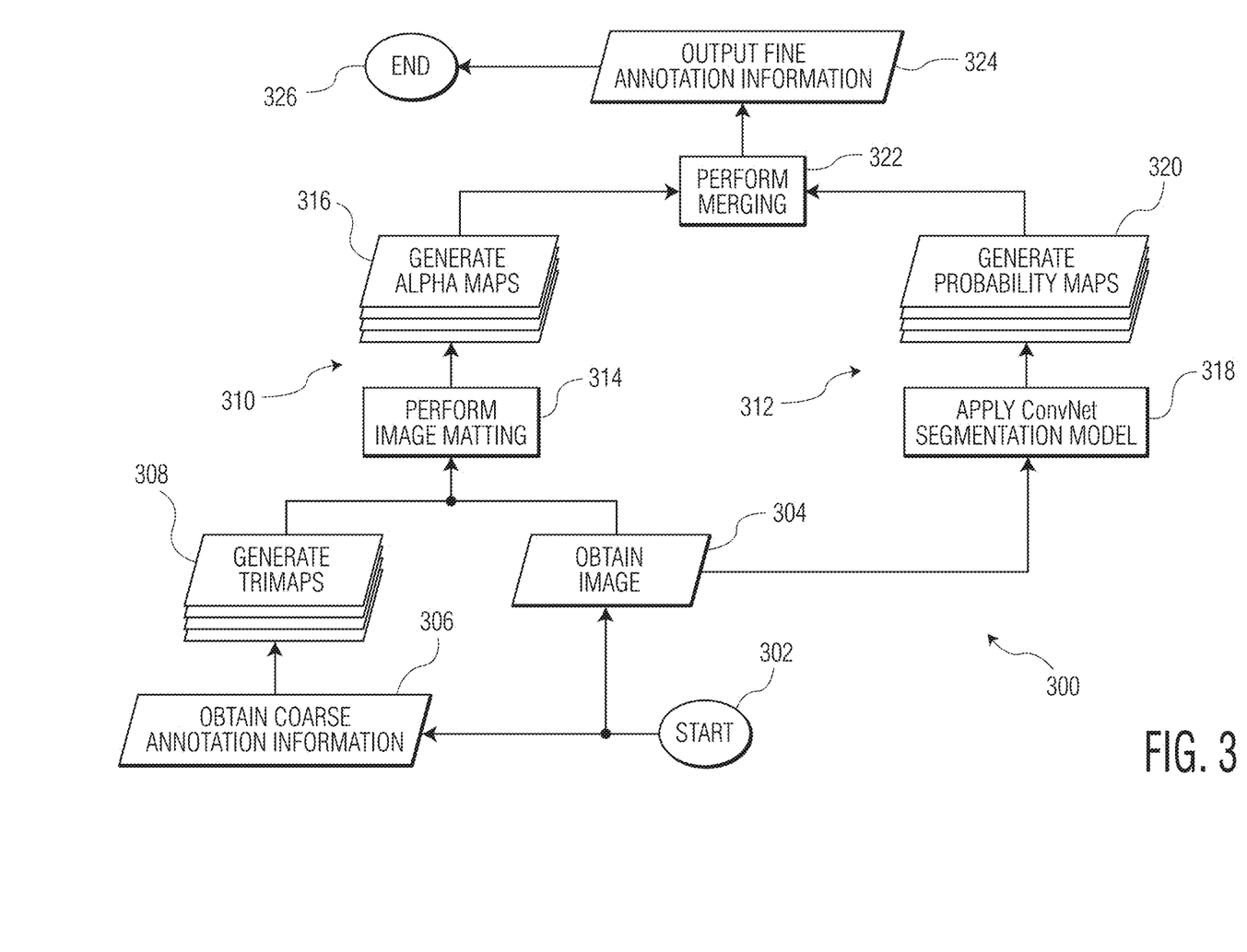
FIG. 3 is flow chart illustrating a method of densifying coarse annotation for semantic segmentation as can be performed by way of the electrical system of FIG. 1, in accordance with an example embodiment encompassed herein.

Turning to FIG. 3, in accordance with the present embodiment, the electrical system 100 described in relation to FIG. 1 and FIG. 2 is configured to perform a method or process of annotation densification for semantic segmentation as illustrated by a flow chart 300. In the present embodiment, the method is performed by the electrical system 106 of the vehicle 102 by itself, except insofar as the electrical system can receive certain input information from an external source such as from one or more of the storage device(s) 112. It should be appreciated that, although the method can be performed by a single computer system (e.g., the computer system 108), it also can be performed by many (e.g., dozens, or hundreds, or more) computer systems or associated processors/processing devices operating in a distributed, parallel, or joint manner as well.

More particularly as shown, in the present embodiment, upon the method commencing at a start step 302, two types of input information are obtained by the electrical system 106. First, input image information is obtained at a step 304 concerning the pixel values of an image with respect to which semantic segmentation is to be performed. Such input image information can be obtained, for example, by way of the camera 212 of the electrical system 106 and, as part of the step of being obtained, can be stored in the memory 202 of the computer system 108. The input image information can be, for example, that of an RGB (red, green, and blue) image.

In addition to the input image information being obtained at the step 304, coarse annotation information is also obtained at a step 306 by the computer system 108. The coarse annotation information typically relates to, or is expected to relate to, the input image information that is obtained at the step 304 or to one or more images (e.g., one or more anticipated input images) in relation to which semantic segmentation is to be performed. Such coarse annotation information can be obtained from a remote or external source such as, for example, one or more of the storage device(s) 112 or the server(s) 116. Upon the information being received at the computer system 108, it also can be stored in the memory 202 of the computer system. One example of coarse annotation information that can be obtained is provided by the Cityscapes dataset (Cordts, M., Omran, M., Ramos, S., Rehfeld, T., Enzweiler, M., Benenson, R., Franke, U., Roth, S., Schiele, B.; The Cityscapes dataset for semantic urban scene understanding. In: CVPR 2016, which is incorporated by reference herein in its entirety), which is a benchmark suite and large-scale dataset for train and test approaches for pixel-level semantic labeling, and which among other things provides approximately 20,000 images with coarse annotations (with respect to these coarse pixel-level annotations, accuracy on object boundaries was traded off for annotation speed by labeling coarse polygons under a sole constraint that each polygon must only include pixels belonging to a single object class).

After the coarse annotation information has been obtained at the step 306, the computer system 108 (and particularly the processor 200 thereof) processes that information to generate trimaps, at a step 308. As will be appreciated, each of the trimaps defines a respective opaque foreground, a respective transparent background, and respective unknown opacity regions. The trimaps (or trimap information) also can be stored in the memory 202 upon being generated. The generation of the trimaps at the step 308 can be considered to be a fully-automatic process step, in that the coarse annotation information obtained at the step 306 can be of a format that is automatically convertible into the trimaps. Indeed, the coarse annotation information can be viewed as a stack of binary masks, each of which corresponds to a category, and thus be converted into (or viewed as providing) trimaps. However, in alternate embodiments, it is possible that the generation of the trimaps may not be a fully-automatic process, but rather can include some user input.

As further illustrated by FIG. 3, the method represented by the flow chart 300 additionally involves a first process subpath 310 and a second process subpath 312, each of which involves processing of the input image information obtained by way of the step 304 by way of the processor 200 of the computer system 108. In the first process subpath 310, natural image matting is first performed at a step 314 to generate intermediate information, which can be referred to as image matting output information. Then, subsequent to the step 314, an additional step 316 is performed in which alpha maps are generated based upon the image matting output information generated at the step 314, and are stored in the memory 202 of the computer system 108. Further with respect to the step 314, it should be appreciated that the natural image matting is performed based not only upon the input image information obtained at the step 304, but also upon the trimaps generated at the step 308 (based upon the coarse annotation information obtained at the step 306). In this regard, natural image matting involves the estimating of per-pixel opacities of a user-defined foreground region (this can be contrasted with spectral matting, in which there is estimating of a set of spatially connected soft segments automatically via spectral decomposition). Also, in general, affinity-based methods of matting define inter-pixel affinities to construct a graph that reflects the opacity transitions in the image.

Additionally, in the second process subpath 312, predictions are generated by way of one or more ConvNets, which in at least some embodiments can be Fully Convolutional Neural Networks. More particularly, the second process subpath 312 first includes a step 318, at which an already-trained ConvNet segmentation model is applied to the input image information (obtained at the step 304) to generate intermediate information, which can be referred to as ConvNet segmentation model output information. Further, the second process subpath 312 also includes an additional step 320 performed subsequent to the step 318. At the additional step 320, probability maps are generated based upon the ConvNet segmentation model output information generated at the step 318, and are stored in the memory 202 of the computer system 108.

It should be appreciated that, although FIG. 3 illustrates the steps 304, 306, 308, 314, 316, 318, and 320 in a particular manner, the timing of execution of these steps can vary depending upon the embodiment. For example, although the obtaining of the input image information at the step 304 and the obtaining of the coarse annotation information at the step 306 can occur at the same or substantially the same times in some embodiments, in alternate embodiments the performing of the step 306 can occur at one or more times that occur earlier than the time at which the step 304 is performed, or vice-versa. Also, the performing of the step 308, involving the generating of the trimaps, can be performed temporally before the step 304 is performed, or vice-versa (or the step 304 can be performed temporally in between the steps 306 and 308).

Also, although the steps 314 and 316 of the first process subpath 310 are shown to be performed in parallel with the steps 318 and 320 of the second process subpath 312, the steps 314, 316, 318, and 320 can be performed in any of a variety of orders in terms of timing. For example, in some embodiments, the steps of the first process subpath 310 can be performed prior to the steps of the second process subpath 312, or vice-versa. Alternatively, the steps of the two process subpaths 310 and 312 can be performed in an alternating or interleaved manner (e.g., with the step 314 preceding the step 318, the step 318 preceding the step 316, and the step 316 preceding the step 320). Additionally, in another alternative embodiment, the steps 314 and 318 can be performed simultaneously together and subsequently the steps 316 and 320 can be performed simultaneously together.

Upon completion of all of the steps 314, 316, 318, and 320 (and particularly the additional steps 316 and 320) of the first and second process subpaths 310 and 312, both the alpha maps and probability maps have been generated and stored in the memory 202 of the computer system 108. At this time, the method shown in the flow chart 300 of FIG. 3 proceeds to a step 322, at which the computer system 108 (and particularly the processor 200) performs a merging or combination operation. According to this merging or combination operation of the step 322, the information contained in the alpha maps generated at the step 316 is merged or combined with the information contained in the probability maps generated at the step 320, so as to generate fine semantic segmentation annotation. Upon the generation of this fine semantic segmentation annotation by way of the step 322, that information is both stored in the memory 202 of the computer system 108 and further can be output at a step 324 to one or more other locations, as fine semantic segmentation annotation information ("fine annotation" information in short). After the outputting of that fine annotation information at the step 324, the method of FIG. 3 ends at an end step 326.

Notwithstanding the end step 326 shown in FIG. 3, however, it should be appreciated that the fine annotation information generated at the step 322 and output at the step 324 can be utilized in other methods and processes that occur after, or based upon, or that encompass, the method of FIG. 3. Indeed, the fine annotation information generated at the step 322 and output at the step 324 generally can be used in any of a variety of manners, and/or be output/directed to or toward any of a number of recipients or for any of a variety of purposes, depending upon the embodiment, implementation, application, or circumstance.

Figure 5:
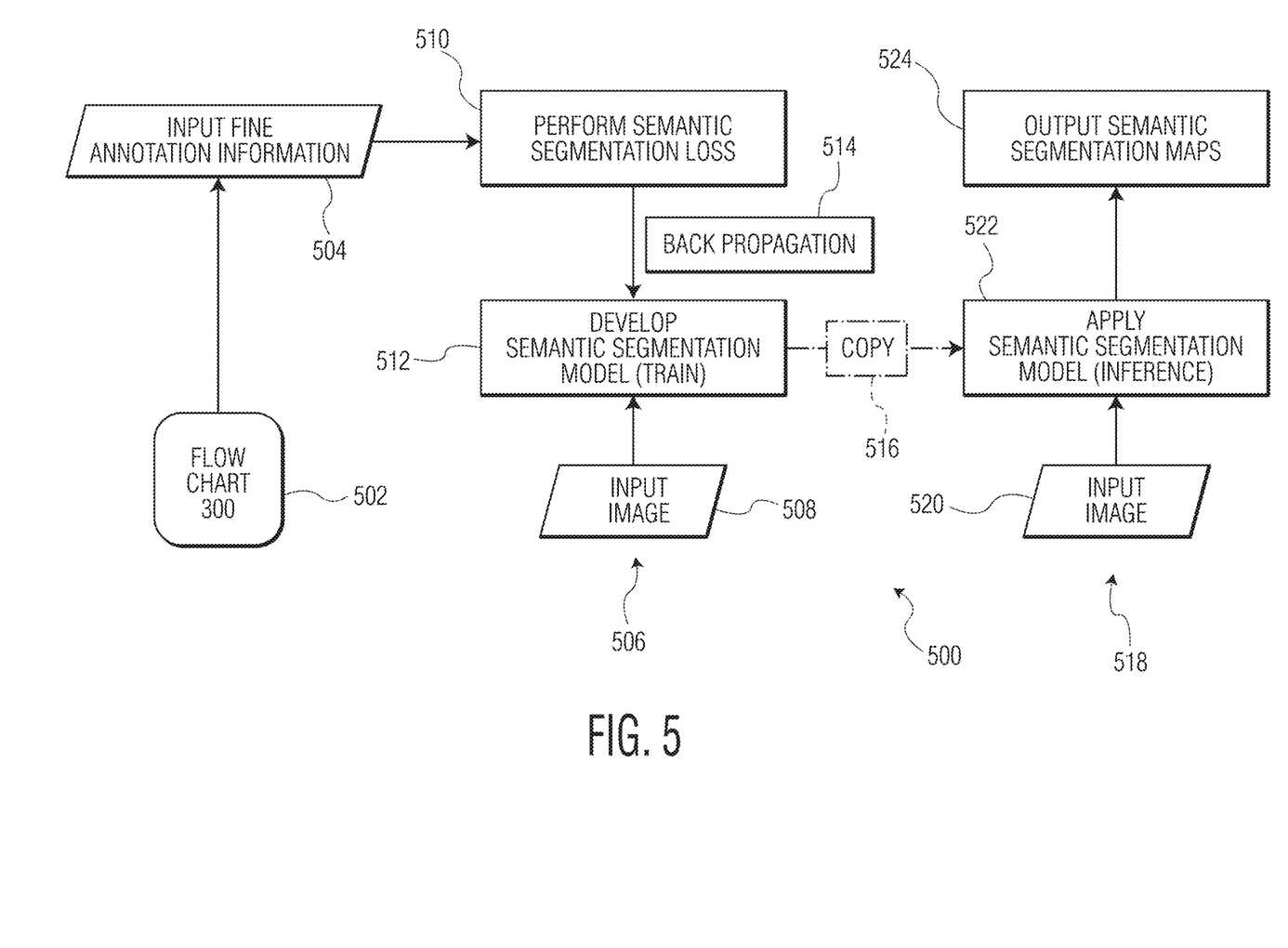
FIG. 5 is an additional flow chart illustrating a semantic segmentation method that can be performed by way of the electrical system of FIG. 1, in accordance with another example embodiment encompassed herein, and that particularly leverages fine semantic segmentation annotation information generated by way of the method of FIG. 3 to train a semantic segmentation model to output semantic segmentation maps.

More particularly in this regard, FIG. 5 provides an additional flow chart 500 illustrating one example of an additional method that encompasses the method of FIG. 3. According to the method of FIG. 5, the fine annotation information generated at the step 322 and output at the step 324 of FIG. 3 is used, along with image information, to train a semantic segmentation model by computing semantic segmentation loss and back-propagating gradients with respect to loss. Further, FIG. 5 additionally illustrates that the trained semantic segmentation model can be employed to generate semantic segmentation output information, or segmentation maps. Such semantic segmentation output information (or segmentation maps) can in turn be output or directed to other recipients, or utilized for other methods or purposes. The method of FIG. 5 additionally in some embodiments can be performed by a processor such as the processor 200, and the processor that performs the method of FIG. 3 can be the same processor that performs the method of FIG. 5. Alternatively, however, different processors can perform different steps or tasks associated with these methods.

As shown by the flow chart 500, the method of FIG. 5 begins with the performing of a step 502, which simply constitutes the performing of the method of FIG. 3 (shown by the flow chart 300). The fine annotation information output at the step 324 discussed above, which is the final operational step of the flow chart 300, can in turn constitute input information for additional steps of the method of FIG. 5. More particularly in this regard, FIG. 5 includes a second step 504 at which the fine annotation information resulting from the method of FIG. 3 is input for use in a training subprocess 506, which particularly includes additional steps 508, 510, and 512. It should be appreciated that, notwithstanding this description involving the steps 324 and 504 concerning the output and input of the fine annotation information, essentially the operation of the flow chart 500 can be understood as simply entailing the providing of the fine annotation information generated at the step 322 for use in the training subprocess 506.

Additionally as shown, training subprocess 506 proceeds based upon not only the input of the fine annotation information at the step 504 but also the input of image information at the step 508 (which for purposes of the present explanation is considered part of the training subprocess). The image information input at the step 508 can be, but need not be, the same as the image information obtained at the step 304 of the flow chart 300. Also, the image information input at the step 508 can be a training dataset (e.g., a set of training images). Upon receiving both the image information at the step 508 and the fine annotation information at the step 504, training can proceed. Training involves propagating back gradients, as represented by a box 514, with respect to a semantic segmentation loss function or operation at the step 510, which also receives the fine annotation information input at the step 504. At the step 510, the semantic segmentation loss function particularly operates to generate and output a gradient of each model parameter with respect to the loss function. Based upon the gradients that are output by the semantic segmentation loss function, the semantic segmentation model is developed or trained, at the step 512.

Upon completion of the training of the semantic segmentation model at the step 512, the training subprocess 506 is completed. When this occurs, a copy of the trained semantic segmentation model is provided, as represented by a dot-dashed box 516, for use in an inference subprocess 518 that is also encompassed by the method of FIG. 5. More particularly as illustrated, the inference subprocess 518 includes a step 520 that also involves the input of image information. The image information input at the step 520 could be, but typically is not, the same as the image information input at the step 508, and also could be, but typically is not, the same as the image information obtained at the step 324 of the flow chart 300. Upon receiving the image information at the step 518, the copy of the trained semantic segmentation model is applied to that image information, or an inference is generated, at the step 522. The performing of the step 518 generates or results in semantic segmentation output information, which can take the form of semantic segmentation maps. Such semantic segmentation output information can be output at a step 524 of the inference subprocess 518, as a final step of the method of FIG. 5.

Although the step 524 involving the output of the semantic segmentation output information is described as the final step of the method of FIG. 5, this step also can be followed by subsequent steps. In particular, the semantic segmentation output information that is output at the step 524 can be directed to any of a variety of recipients, and/or utilized for any of a variety of purposes. For example, assuming that the method of improving semantic segmentation of FIG. 3 is being performed by the electrical system 106 of FIG. 1 and FIG. 2, the semantic segmentation output information can be directed to one or more of the remote electrical system components 104 such as one or more of the storage device(s) 112, one or more of the mobile device(s) 114, one or more of the server(s) 116, and one or more of the other device(s) or system(s) 118 as shown in FIG. 1. Also, the semantic segmentation output information can be directed to one or more devices within the electrical system 106 such as one or more of the other input/output device(s) 216 that can utilize that information.

Although in the present embodiment it is the processor 200 that is described as performing steps of the methods FIG. 3 and FIG. 5, including the merging between alpha maps from natural image matting and probability maps generated by ConvNet of the step 322, the training of the semantic segmentation model at the step 512, and the application of the semantic segmentation model (or copy thereof) at the step 522, the processor 200 can also perform additional steps as well depending upon the embodiment. In some such circumstances, the step 524 involving outputting of the semantic segmentation output information (e.g., semantic segmentation maps) can also be understood as involving the outputting/directing of that information back to the processor 200 (e.g., from the memory 202) or to another portion of the processor 200 (e.g., to another processing device among several processing devices of the processor 200) for use by the processor 200.

For example, in some cases it may be desirable for the semantic segmentation output information (e.g. semantic segmentation maps) to be output/directed to the processor 200, at the step 524, so as to allow that processor to perform one or more monitoring or control operations based upon that semantic segmentation output information. Further for example, it may be desirable for the semantic segmentation output information to be output/directed to the processor 200 so as to allow that processor to make autonomous vehicle driving determinations and/or provide control signals based upon that information. Such determinations can be made by the processor 200 or computer system 108 based upon the semantic segmentation output information alone or in combination with other information, such as that provided by other sensors or sensing systems that can detect aspects of the environment surrounding the vehicle 102 (e.g., radar or lidar sensing systems). Additionally for example, the processor 200 or computer system 108 can generate and provide control signals to one or more of the input/output device(s) 216, for example, to any of an acceleration actuator, a brake actuator, a steering actuator, a turn signal actuator, or a light actuator of the vehicle 102, possibly based upon such determinations.

Relatedly, the step 524 should be understood to be representative more generally of a step in which either some or all of the semantic segmentation output information resulting from the step 522 is output/directed (or sent for receipt) to or toward any of a number of recipients, or a step in which signal(s) or other information generated based upon the semantic segmentation output information resulting from the step 522 is or are output/directed to or toward any of a number of recipients. Thus, in at least some embodiments, the step 524 can also be understood as including one or more substeps in which the semantic segmentation output information resulting from the step 522 is processed or modified, alone or in combination with additional information from other sources, so as to generate other information or one or more signal(s) (e.g., control signal(s)) that can be output/directed to or toward one or more recipient(s)). In such embodiments, the step 524 can also include a substep of outputting/directing such other information or signal(s) to one or more recipient(s). Understood in this manner, the step 524 can again be understood to include the generating and providing of control signals to one or more of the input/output device(s) 216, for example, to any of an acceleration actuator, a brake actuator, a steering actuator, a turn signal actuator, or a light actuator of the vehicle 102, based upon the semantic segmentation output information resulting from the step 522.

Additionally with reference to FIG. 3, the merging or combination operation that is performed at the step 322 can take any of a variety of different forms, or be performed in any of a variety of manners, depending upon the embodiment or operational circumstance. One example manner of performing merging or combination at the step 322 that is encompassed by the present disclosure is heuristics based merging. An alternative example manner of performing merging or combination at the step 322 that is encompassed by the present disclosure is learning based merging.

More particularly, heuristics based merging entails merging of the matting alpha values (e.g., the values provided in the alpha maps generated at the step 316) with or into the ConvNet prediction values (e.g., as provided in the probability maps generated at the step 320) following heuristics, so as to generate fine semantic segmentation annotation values (pixel labels) $P_i$. In one embodiment, heuristics based merging is performed in accordance with Equation 1 as follows:

$$P_i = \underset{j}{\operatorname{argmax}}[(1-r) \cdot p_{ij} + r \cdot \operatorname{normalize}(m_{ij})] \qquad (1)$$

More particularly with respect to Equation 1, it should be understood that the values $m_{ij}$ are alpha values that constitute the alpha map information generated at the step 316. Additionally, normalization among alpha values $m_{ij}$ of category j of pixel i is applied to constrain those values to within [0, 1]. As an aside, it should be appreciated that such alpha values $m_{ij}$ can serve as a basis for generating fine semantic segmentation annotation values (pixel labels) $P_i$ alone, without being merged with the ConvNet prediction values, if the semantic segmentation output values are calculated based upon a modified version of Equation 1 shown as Equation 2 below:

$$P_i = \underset{j}{\operatorname{argmax}}(m_{ij}) \qquad (2)$$

Again with respect to Equation 1 above pertaining to heuristics based merging, it should further be understood that each value $p_{ij}$ constitutes the probability predicted by the ConvNet of a pixel i belonging to a category j. Thus the values $p_{ij}$ of category j of pixel i are probability map values that constitute the probability map information generated at the step 320. The particular ConvNet that can be applied can vary depending upon the embodiment and, in one example embodiment, can be DeepLab, which was introduced by Chen et al. (Chen, L. C., Papandreou, G., Kokkinos, I., Murphy, K., Yuille, A. L.: DeepLab: semantic image segmentation with deep convolutional nets, atrous convolution, and fully connected CRFs. TPAMI2017, which is incorporated by reference herein in its entirety). Finally, also with respect to Equation 1, $r \in [0, 1]$ is the weight blending the alpha map and the probability map, with it being understood that the parameter r is chosen by heuristics and is to be decided empirically (0.5 by default). Thus, with Equation 1 understood and applied as discussed above, fine semantic segmentation annotation values $P_i$ can be generated by way of heuristics based merging in accordance with Equation 1 at the step 322, and those output values $P_i$ can be further output at the step 324 as the fine annotation information.

As mentioned above, the above-described heuristics based merging of ConvNet predictions (e.g., the probability maps generated by the step 320) and the results of matting (e.g., alpha maps generated by the step 316) is only one example manner of performing the merging or combining at the step 322. An alternative example manner of merging, also encompassed by the present disclosure, is learning based merging. Learning based merging particularly can be performed in accordance with Equation 3 as follows:

$$P_i = \underset{j}{\operatorname{argmax}}\{h[f(p_{ij}) \oplus g(m_{ij})]\} \qquad (3)$$

More particularly with respect to Equation 3, it should be appreciated that fine semantic segmentation annotation values (pixel labels) $P_i$ are generated based upon both the probability map values $p_{ij}$ generated at the step 320 and the alpha values $m_{ij}$ generated at the step 316. However, in contrast to Equation 1 above, merging performed in accordance with Equation 3 occurs by way of convolution based mappings f, g, h and also an element-wise adding operation represented by the symbol $\oplus$. More particularly as shown, the element-wise adding operation is performed so as to add the results of two convolution based mappings f and g that are respectively performed in relation to the probability map values $p_{ij}$ and alpha values $m_{ij}$, respectively, and then a further convolution based mapping h is performed upon the results of the element-wise adding operation, so as to generate the semantic segmentation output values $P_i$, which can then be output at the step 324.

Figure 4:
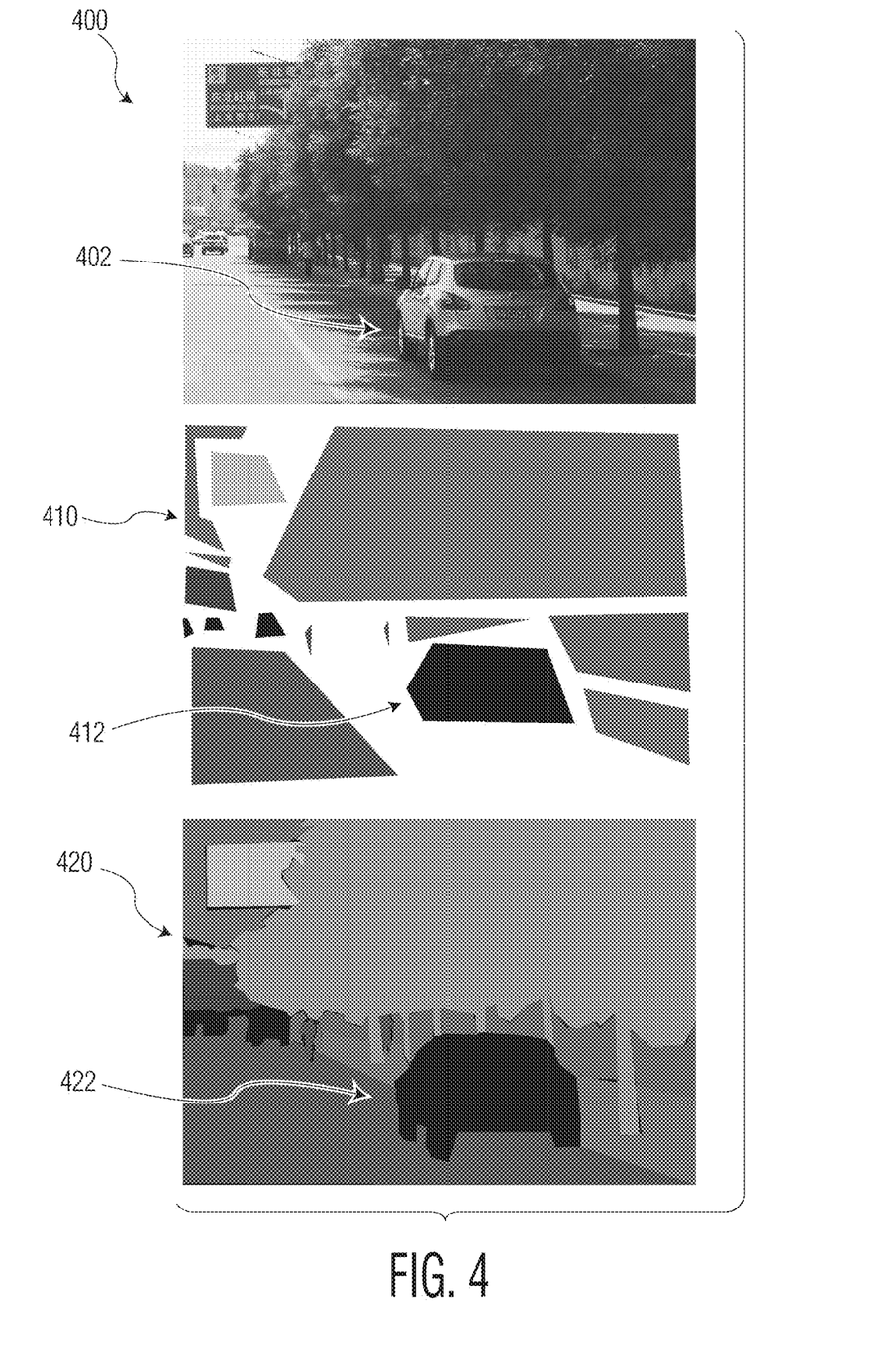
FIG. 4 shows three images respectively illustrating example image information, example coarse semantic segmentation annotation information, and fine semantic segmentation annotation information that can be generated by way of the method of FIG. 3, based upon that example image information and coarse annotation information.

Turning to FIG. 4, first, second, and third images 400, 410, and 420 are shown, which are intended to illustrate one example of fine semantic segmentation annotation information that can be generated in accordance with the method of improving semantic segmentation described above in accordance with FIG. 3. More particularly, in FIG. 4, the first image 400 is an example of image information concerning a scene, which can be obtained at the step 304 of the method represented by the flow chart 300 of FIG. 3. In this example, the image information particularly includes a first image portion 402 that will be recognized as a car. Further, the second image 410 is an example of coarse semantic segmentation annotation information concerning the same scene as is the subject of the first image 400, where the coarse semantic segmentation annotation information can be obtained at the step 306 of the method represented by the flow chart 300 of FIG. 3. With respect to the second image 410, it will be appreciated that a polygonal region 412 of the second image generally corresponds to the position of the first image portion 402 of the first image 400, but has a shape that only generally corresponds to that of the car shown in the first image portion 402. For example, contours of wheels of the car that are visible in the first image portion 402 are missing from the outline of the polygonal region 412.

Finally, the third image 420 shows example fine semantic segmentation annotation information as can be generated at the step 322 and output at the step 324 of the method represented by the flow chart 300, in response to the method being performed based upon the obtaining of the input information shown in the first image 400 at the step 304 and the coarse annotation information shown in the second image 410 at the step 306. That is, the third image 420 shows example fine semantic segmentation annotation that can be generated based upon the performing of the method of FIG. 3, including the steps 308, 314, 316, 318, and 320 respectively as intermediate steps between the step 322 and the steps 304 and 306 in the manner shown in FIG. 3. As will be appreciated from close inspection of the third image 420, an image portion 422 toward the bottom of that third image has an outline or boundary that closely approximates the shape of the car shown in the first image portion 402 of the first image 400. All of the pixels along and within that boundary will have the same semantic label, and these semantic labels associated with the various pixels can constitute the fine semantic segmentation annotation information provided as a result of the step 322 and output at the step 324.

From this vantage point, the fine semantic segmentation annotation information shown in the third image 420 is highly accurate in terms of its correspondence to the actual imagery shown in the image information shown by the first image 400 that is obtained at the step 304. Among other things, it should be recognized that details such as the exactness of the outline of the car is of high quality in the third image 420 of FIG. 4.

It should be noted that, to generate the third image 420 of FIG. 3, the merging performed at the step 322 of the method of improving semantic segmentation particularly can be heuristics based merging in accordance with Equation 1 above, and closed-form matting can be employed (due to it being based on local pixel affinities and having a closed-form solution).

It can further be noted that, in at least some circumstances, the value of the parameter r used for heuristics based merging can be selected by: (a) generating semantic segmentation results in accordance with Equation 1 based upon $p_{ij}$ values (probability map information) generated by a ConvNet as described in regard to FIG. 3, but also based upon $m_{ij}$ values (alpha map information) generated from matting in which coarse semantic segmentation annotation was used to generate the trimaps upon which the natural image matting was performed; and (b) varying the value of the parameter r to attain a maximal mIoU (mean Intersection over Union) value. Such a process for selecting the value of the parameter r would typically be performed prior to (e.g., just prior to) the performing of the step 322 concerning the performing of merging in accordance with heuristics based merging. As such, although not shown in FIG. 3, such a process of determining the parameter r can be considered an additional step (or subprocess) of the method of FIG. 3 that is performed prior to the step 322.

In view of the above discussion, it should be appreciated that one or more advantages can be achieved by way of performing semantic segmentation in accordance with one or more of the improved methods described herein. Indeed, performing semantic segmentation in accordance with (or based at least in part upon) one or more of the methods for improving semantic segmentation described herein makes it possible to automatically upgrade the coarse semantic annotations into fine ones, through a "densification" procedure, so as to obtain larger amounts of training data to be used by learning-based semantic segmentation approaches. With such a method, it is possible to generate fine semantic annotations of comparable quality of the manually labeled ones, but at lower labeling cost.

As already discussed above, the present disclosure is intended to encompass a variety of methods of improving semantic segmentation. Also, the present disclosure is intended to encompass a variety of larger methods that include, as parts of those methods, the performing of semantic segmentation in accordance with any of the improved methods described herein. Further, it should be appreciated that, although the flowchart description provided with the present disclosure (e.g., in FIG. 3 and FIG. 5) illustrates processes and process steps (or operations) that can be performed by one or more systems or devices according to some embodiments encompassed by the present disclosure, the present disclosure is intended to encompass modified versions of these processes and process steps (or operations). For example, in some other embodiments encompassed herein, one or more of the steps of the methods shown in FIG. 3 and FIG. 5 can be performed in different orders than that shown, in inverted orders relative to what is shown, or at different relative times than what is being described above. Further for example, even if two process steps are described above as occurring at different times, the present disclosure is intended to encompass other embodiments in which those process steps occur simultaneously, or vice-versa. Further, the present disclosure is intended to encompass embodiments in which one or more other operations may be added or omitted relative to the processes described above.

While the principles of the invention have been described above in connection with specific apparatus and method, it is to be clearly understood that this description is made only by way of example and not as a limitation on the scope of the invention. It is specifically intended that the present invention not be limited to the embodiments and illustrations contained herein, but include modified forms of those embodiments including portions of the embodiments and combinations of elements of different embodiments as come within the scope of the following claims,

What is claimed is:

1. A method of annotation densification for semantic segmentation, the method comprising:
    obtaining image information concerning one or more first images;
    obtaining coarse annotation information;
    generating at least one trimap based upon the coarse annotation information;
    performing an image matting operation based upon the image information and based upon the at least one trimap, by way of at least one processing device;
    generating alpha map information based upon first intermediate information resulting from the image matting operation;
    applying an already-trained Convolutional Neural Network (ConvNet) semantic segmentation model based upon the image information, by way of the at least one processing device;
    generating probability map information based upon second intermediate information resulting from the applying of the already-trained ConvNet semantic segmentation model;
    performing a merging operation with respect to both the alpha map information and the probability map information, by way of the at least one processing device,
    wherein the performing of the merging operation results in fine semantic segmentation annotation information including a plurality of semantic labels pertaining respectively to a plurality of pixels of the one or more first images;
    training an additional semantic segmentation model using the fine semantic segmentation annotation information and image information;
    using the trained additional semantic segmentation model for inference to generate semantic segmentation output information; and
    outputting at least some of the semantic segmentation output information, or other information or at least one signal based at least indirectly upon the at least some of the semantic segmentation output information, for receipt by another device or system.

2. The method of claim 1, wherein the merging operation is a heuristics based merging operation.

3. The method of claim 2, wherein the heuristics based merging operation includes determining a plurality of pixel values $P_i$ to be included in the fine semantic segmentation annotation information in accordance with:

$$P_i = \operatorname*{argmax}_j [(1-r) \cdot p_{ij} + r \cdot \operatorname{normalize}(m_{ij})]$$

4. The method of claim 1, wherein the merging operation is a learning based merging operation.

5. The method of claim 4, wherein the learning based merging operation includes determining a plurality of pixel values $P_i$ to be included in the fine semantic segmentation annotation information in accordance with:

$$P_i = \operatorname*{argmax}_j \{h[f(p_{ij}) \oplus g(m_{ij})]\}$$

6. A method of annotation densification for semantic segmentation, the method comprising:
    obtaining image information concerning one or more first images;
    obtaining coarse annotation information;
    performing an image matting operation based upon the image information and based at least indirectly upon the coarse annotation information, by way of at least one processing device;
    applying an already-trained Convolutional Neural Network (ConvNet) semantic segmentation model in relation to the image information, by way of the at least one processing device;
    performing a merging operation with respect to both first intermediate information generated at least indirectly by the performing of the image matting operation and second intermediate information generated at least indirectly by the applying of the already-trained ConvNet semantic segmentation model, by way of the at least one processing device,
    wherein the performing of the merging operation results in fine semantic segmentation annotation information pertaining to a plurality of pixels of the one or more first images,
    whereby an additional semantic segmentation model can be trained using the fine semantic segmentation annotation information, and the trained additional semantic segmentation model or a copy of the trained additional semantic segmentation model can be applied to generate semantic segmentation output information.

7. The method of claim 6, wherein the image information is obtained at least indirectly from one or more camera devices, and wherein the coarse annotation information at least indirectly relates to the one or more first images and is received from at least one storage device.

8. The method of claim 6, further comprising generating one or more alpha maps including the first intermediate information.

9. The method of claim 8, wherein the generating of the one or more alpha maps is performed subsequent to the performing of the image matting operation and prior to the performing of the merging operation, and wherein the performing of the image matting operation results in matting output information based upon which the generating of the one or more alpha maps is performed.

10. The method of claim 6, further comprising generating one or more probability maps including the second intermediate information.

11. The method of claim 10, wherein the generating of the one or more probability maps is performed subsequent to the applying of the already-trained ConvNet semantic segmentation model and prior to the performing of the merging operation, and
    wherein the applying of the already-trained ConvNet semantic segmentation model results in probability information based upon which the generating of the one or more probability maps is performed.

12. The method of claim 6, further comprising generating one or more trimaps based on the coarse annotation information, wherein the image matting operation is performed based upon the one or more trimaps.

13. The method of claim 6, further comprising:
outputting at least some of the fine semantic segmentation annotation information; and
training the additional semantic segmentation model upon receiving the fine semantic segmentation annotation information after the outputting.

14. The method of claim 13, further comprising:
applying the trained additional semantic segmentation model, or a copy of the trained additional semantic segmentation model, in relation to additional image information, so as to generate the semantic segmentation output information; and
additionally outputting at least some of the semantic segmentation output information, or outputting other information or one or more signals based at least indirectly upon the at least some of the semantic segmentation output information, for receipt by an additional device or system.

15. The method of claim 14, further comprising the outputting of the other information or one or more signals, wherein the other information or one or more signals includes a first control signal that is directed to the additional device or system.

16. The method of claim 6, wherein the merging operation is a heuristics based merging operation.

17. The method of claim 16, wherein the heuristics based merging operation includes determining a plurality of pixel values $P_i$ to be included in the fine semantic segmentation annotation information in accordance with:

$$P_i = \underset{j}{\mathrm{argmax}}[(1-r) \cdot p_{ij} + r \cdot \mathrm{normalize}(m_{ij})]$$

18. The method of claim 6, wherein the merging operation is a learning based merging operation.

19. The method of claim 18, wherein the learning based merging operation includes determining a plurality of pixel values $P_i$ to be included in the fine semantic segmentation annotation information in accordance with:

$$P_i = \underset{j}{\mathrm{argmax}}\{h[f(p_{ij}) \oplus g(m_{ij})]\}$$

20. A system for annotation densification for semantic segmentation, the system comprising:

one or more storage devices configured to store both image information concerning one or more first images and coarse annotation information;

one or more processing devices coupled at least indirectly with the one or more storage devices, wherein the one or more processing devices are configured to execute instructions according to which the one or more processing devices:

(a) generate at least one trimap based upon the coarse annotation information;

(b) perform an image matting operation based upon the image information and based upon the at least one trimap;

(c) generate alpha map information based upon first intermediate information resulting from the image matting operation;

(d) apply an already-trained Convolutional Neural Network (ConvNet) semantic segmentation model in relation to the image information;

(e) generate probability map information based upon second intermediate information resulting from the applying of the already-trained ConvNet semantic segmentation model; and (f) perform a merging operation with respect to both the alpha map information and the probability map information, wherein the merging operation results in fine semantic segmentation annotation information including a plurality of semantic labels pertaining respectively to a plurality of pixels of the one or more first images;

(g) train an additional semantic segmentation model using the fine semantic segmentation annotation information and image information; and (h) use the trained additional semantic segmentation model for inference to generate semantic segmentation output information; and one or more output devices coupled at least indirectly with the one or more processing devices, wherein the one or more output devices is or are configured to output at least some of the semantic segmentation output information, or other information or at least one signal based at least indirectly upon the at least some of the semantic segmentation output information, for receipt by another device or system.

* * * * *